(12) United States Patent
Frank et al.

(10) Patent No.: US 8,701,106 B2
(45) Date of Patent: Apr. 15, 2014

(54) HASHING STORAGE IMAGES OF A VIRTUAL MACHINE

(75) Inventors: Shahar Frank, Ramat Hasharon (IL); Ayal Baron, Kiryat (IL)

(73) Assignee: Red Hat Israel, Ltd., Raanana (IL)

( * ) Notice: Subject to any disclaimer, the term of this patent is extended or adjusted under 35 U.S.C. 154(b) by 712 days.

(21) Appl. No.: 12/325,232

(22) Filed: Nov. 30, 2008

(65) Prior Publication Data
US 2010/0138827 A1 Jun. 3, 2010

(51) Int. Cl.
*G06F 9/455* (2006.01)
(52) U.S. Cl.
USPC .............................................. 718/1
(58) Field of Classification Search
None
See application file for complete search history.

(56) References Cited

U.S. PATENT DOCUMENTS

| | | | |
|---|---|---|---|
| 6,789,156 B1 | 9/2004 | Waldspurger | |
| 7,925,850 B1* | 4/2011 | Waldspurger et al. | 711/162 |
| 2006/0005189 A1* | 1/2006 | Vega et al. | 718/1 |
| 2006/0155735 A1* | 7/2006 | Traut et al. | 707/101 |
| 2010/0153617 A1* | 6/2010 | Miroshnichenko et al. | 711/6 |

OTHER PUBLICATIONS

Qumranet, Inc., "Solid ICE™ Overview", copyright 2008 Qumranet, Inc., Apr. 2008, pp. 1-15.
Qumranet, Inc., "KVM-Kernel-based Virtualization Machine", White paper, copyright 2006 Qumranet, Inc., pp. 1-5.
Qumranet, Solid ICE™, Connection Broker, Apr. 2008, 7 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Emerson Puente
*Assistant Examiner* — Dong Kim
(74) *Attorney, Agent, or Firm* — Lowenstein Sandler LLP (57) ABSTRACT

Virtual machine images are transferred from a source storage location to a target storage location over a network. In one embodiment, a host at the source storage location computes signature values of a plurality of disk blocks that contain a plurality of virtual machine images. Each computed signature value corresponds to one of the disk blocks. A subset of the disk blocks, all of which have different signature values, is then transferred from the source storage location to the target storage location. Only one copy of duplicate disk blocks is transferred.

14 Claims, 5 Drawing Sheets

HASHING STORAGE IMAGES OF A VIRTUAL MACHINE

TECHNICAL FIELD

Embodiments of the present invention relate to virtual machines, and more specifically, to the transfer of stored virtual machine images.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

Virtual machines can be provided by a centralized host that is coupled to multiple clients over a network. Each client can provide a virtual desktop environment indistinguishable from a physical desktop. In a system where clients are spread over several geographical locations, such as an organization that has multiple offices, each location can have a centralized host that provides virtual machines to its local users at the same location. The virtual machine images are stored in the local data storage at each location. In some scenarios, the images of virtual machines may be transferred from one location to another location over the network. For example, the transfer may occur for backup purposes or when the user of a virtual machine moves from one location to another. Transferring the virtual machine images typically consumes a significant amount of network bandwidth and the transmission can be slow.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for reducing the size of virtual machine images that are transferred from one storage location to another storage location. In one embodiment, a host at the source storage location computes signature values of a plurality of disk blocks that contain a plurality of virtual machine images. Each computed signature value corresponds to one of the disk blocks. A subset of the disk blocks, all of which have different signature values, is then transferred from the source storage location to the target storage location. Only one copy of the disk blocks having identical signature values is transferred.

In the following description, the term "virtual machine image," is used to describe the binary data that constitutes the virtual machine. The virtual machine is run on a host and supports a virtual desktop on a client that is coupled to the host via a network. Virtual machine images are sometimes transferred from one storage location to another storage location. In one scenario, virtual machine images may be transferred when data in one storage location (e.g., a branch office) needs to be synchronized with the data in another storage location (e.g., the main office). In another scenario, virtual machine images may be transferred such that the images can follow the movement of their users. For example, when a group of users travel from one office to another office, their virtual machine images may be sent along with them such that the users can access the images from a local storage location. If the offices are located in different parts of the world (e.g., different continents) and the images are stored in one location only, remote access over the network in real time can cause excessive latency. The size of the images can be on the order of multiple gigabytes and, therefore, can occupy a significant amount of network bandwidth. The techniques described herein reduce the amount of data to be transferred over the network and increase the efficiency of data transfer.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "computing", "transferring", "identifying", "hashing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
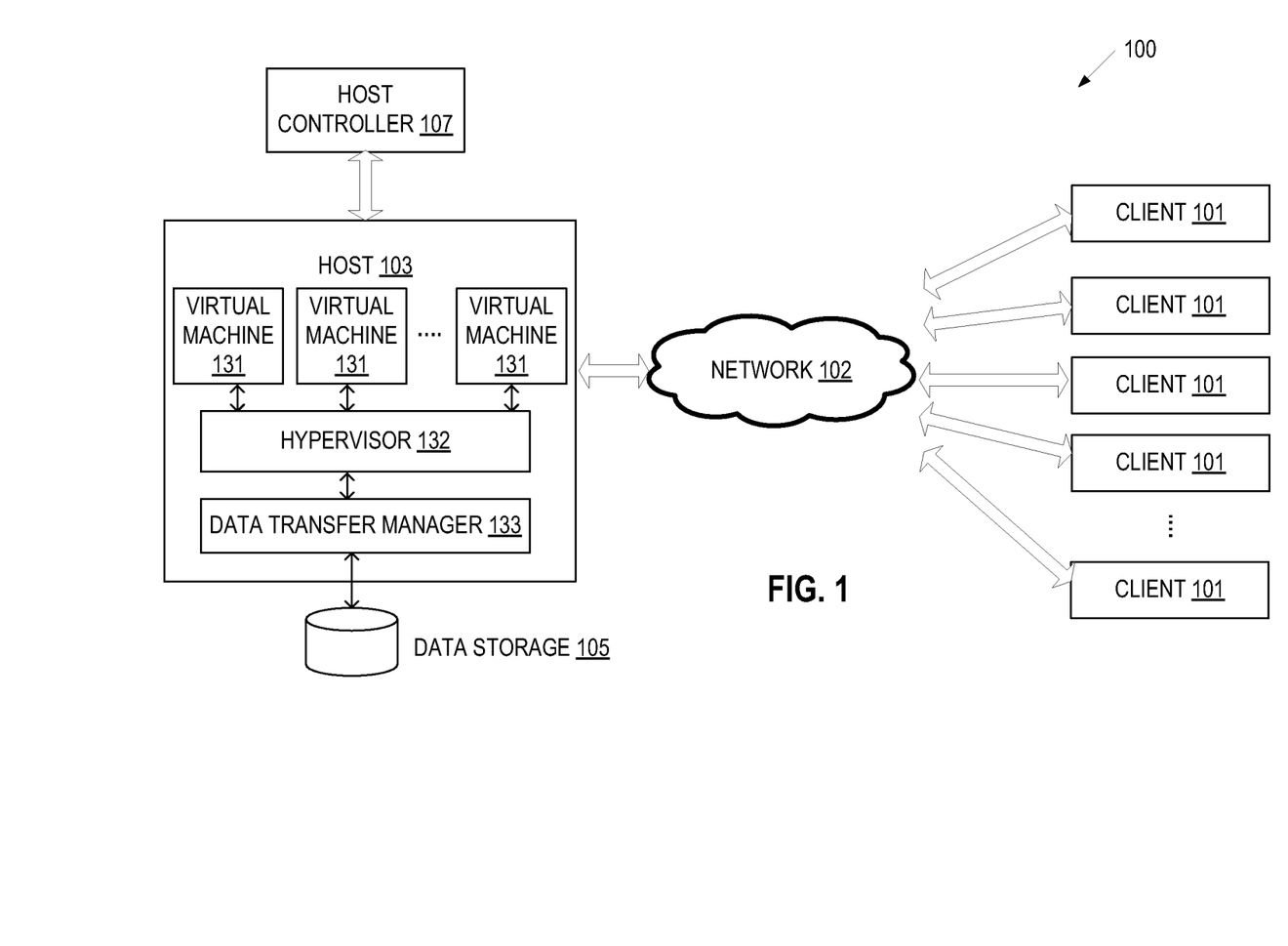
FIG. 1 illustrates an exemplary network architecture in which embodiments of the present invention may operate.

FIG. 1 illustrates an exemplary network architecture 100 in which embodiments of the present invention may operate. The network architecture 100 includes a host 103 coupled to one or more clients 101 over a network 102. The network 102 may be a private network (e.g., a local area network (LAN), wide area network (WAN), intranet, etc.) or a public network (e.g., the Internet). The host 103 is also coupled to a data storage 105. In addition, the host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications, which receive multimedia data streams or other data from the host 103 and re-direct the received data to a local display or other user interface.

In one embodiment, the host 103 includes a server or a cluster of servers to run one or more virtual machines 131. Each virtual machine 131 runs a guest operating system (OS) that may be different from one virtual machine to another. The guest OS may include Microsoft Windows, Linux, Solaris, Mac OS, etc. The host 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102. In one scenario, each virtual machine 131 provides a virtual desktop for the client 101. The images of the virtual machines 131 can be stored by the host 103 in the disk blocks of data storage 105 (the terms "disk blocks" and "blocks" are used interchangeably in the following description) The virtual machine images can be backed up, periodically or on command, in the data storage 105 or on a separate backup device, such as tapes. When a user logs onto his virtual machine on one of the clients 101, the host 103 retrieves the user's virtual machine image from the data storage 105, and presents a virtual desktop on the client display. From the user's point of view, the virtual desktop functions as a physical desktop (e.g., a personal computer) and is indistinguishable from a physical desktop.

In one embodiment, the virtual machines 131 can be managed by the host controller 107. The host controller 107 may also add a virtual machine, delete a virtual machine, balance the load on the server cluster, provide directory service to the virtual machines 131, and perform other management functions.

According to one embodiment of the present invention, the host 103 includes a data transfer manager 113 that manages the transfer of disk blocks in data storage 105 from one storage location (e.g., data storage 105) to another storage location (not shown). The data transfer manager 113 reduces the amount of data transfer between the storage locations by transmitting only one copy of duplicate disk blocks. The data transfer manager 113 will be described in greater detail with reference to FIGS. 2-4.

Figure 2:
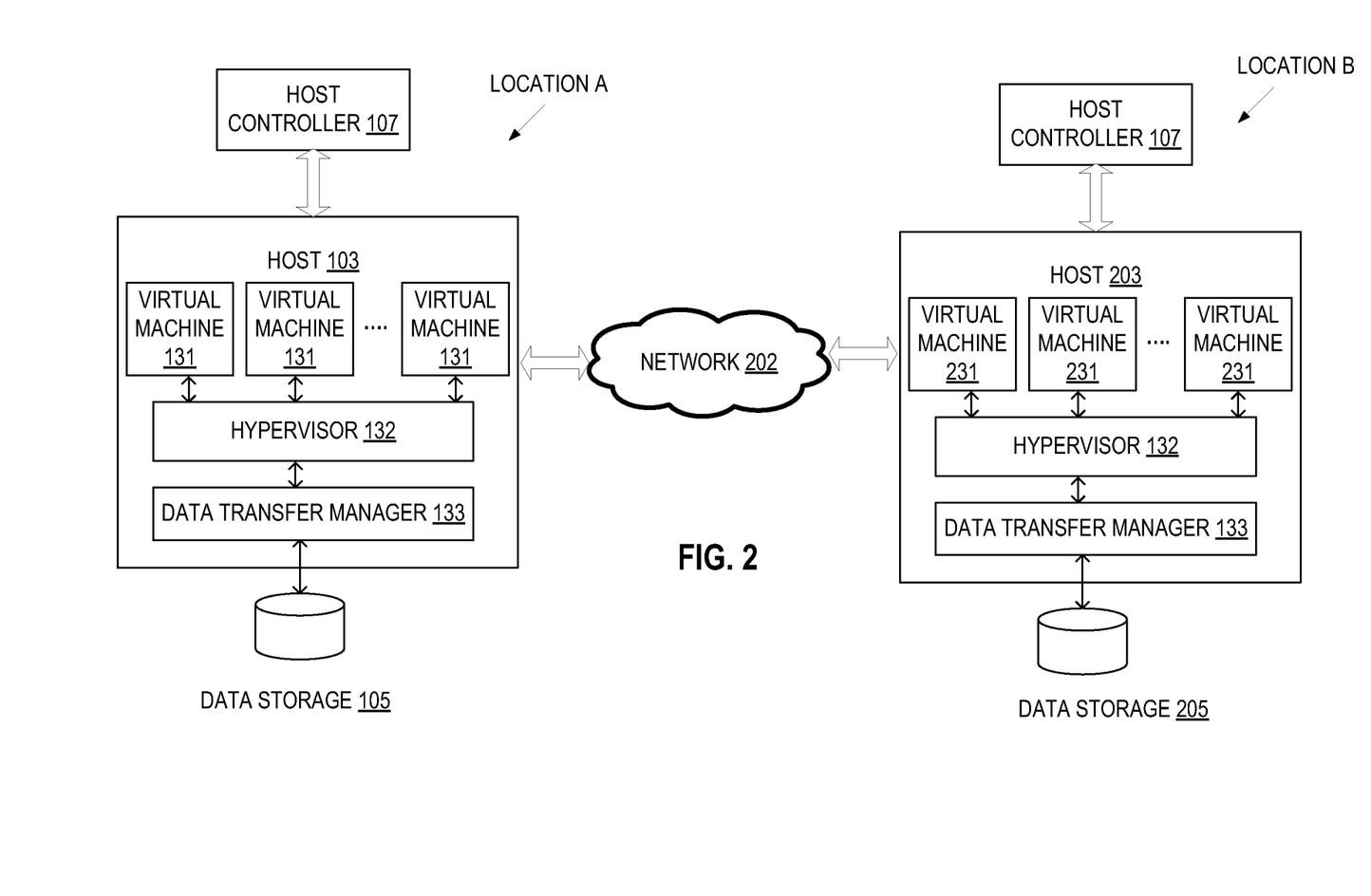
FIG. 2 illustrates an embodiment of a virtual desktop system of an organization that operates in two geographical locations, with each location having a host and data storage.

FIG. 2 illustrates an embodiment of a virtual desktop system 200 of an organization that operates in multiple geographical locations (e.g., locations A and B). Although two locations are shown, it is understood that the system 200 may operate in any number of geographical locations, with each location having a host, a data storage, and local clients. For example, location A can be the headquarters of the organization and location B can be a branch office. Alternatively, location A can be a division of the organization in the U.S. and location B can be another division of the organization in Germany. In this embodiment, location A is provided with the host 103 of FIG. 1, and location B is provided with a host 203. Hosts 103 and 203 are coupled by a network 202. The network 202 can be a proprietary network, such as a virtual private network (VPN), a wide-area network (WAN), or a public network such as the Internet.

Each host (103, 203) runs virtual machines (131, 231) to support virtual desktops for use by its local clients (not shown). The images of the virtual machines of each location are stored locally in the data storage (105, 205) at the same location. Although a user in one location can be configured to remotely access, in real time, a virtual machine image stored in another location over the network 202, the geographic distance between the locations can often result in undesired data latency.

In some scenarios, virtual machine images stored in one location (e.g., location A, also referred to as the source location) may be transferred to another location (e.g., location B, also referred to as the target location) on demand or on a periodic basis. For example, the virtual machine images stored in a branch office may be transferred periodically (e.g., every night or every weekend) to the headquarters to synchronize the stored images at both locations. As another example, when a group of users travel from one location (e.g., the U.S.) to another (e.g., Germany), their virtual machine images stored in the U.S. data storage may be transferred to the German location. Having local access to their virtual machine images allows these users to work in the remote location more efficiently.

Transferring stored virtual machine images over a network can consume a significant amount of network bandwidth. However, some of the disk blocks that contain multiple virtual machine images can be duplicate disk blocks. For example, multiple virtual desktop users may share the same emails, system and user files, etc. Further, in a scenario where files in a remote office are periodically (e.g., daily) transferred to a main office for backup, some disk blocks in today's backup may have already been transferred in yesterday's backup. The data transfer managers 133 on the host (103, 203) can detect duplicate disk blocks in the virtual machine images to be transferred, as well as the differential blocks in two versions of an image (e.g., a current version versus a previous version). The data transfer managers 133 compare two versions of a virtual machine image to determine the difference (in disk blocks), and then transfer the disk blocks that contain the difference. The data transfer mangers 133 can also examine multiple images at a time to detect duplication, and then transfer the disk blocks that do not contain duplication. The disk blocks are transferred from one storage location (e.g., data storage 105) to another storage location (e.g., data storage 205) by the hosts (103, 203). Clients are not involved in the data transfer.

After the data blocks are transferred to the target location (e.g., location B), the host 203 can reconstruct the virtual machine images. In one embodiment, the host 103 sends a complete list of signature values for each transferred virtual machine to the host 203. The complete list for each virtual machine identifies all of the disk blocks that constitute the virtual machine, including the duplicate blocks. Based on the list, the data transfer manager 133 of host 203 can re-assemble the disk blocks for each virtual machine and reconstruct the virtual machine at the target location. An alternative block transfer and reconstruction technique, which is more efficient than the above-described approach, will be explained with reference to FIG. 4.

Figure 3:
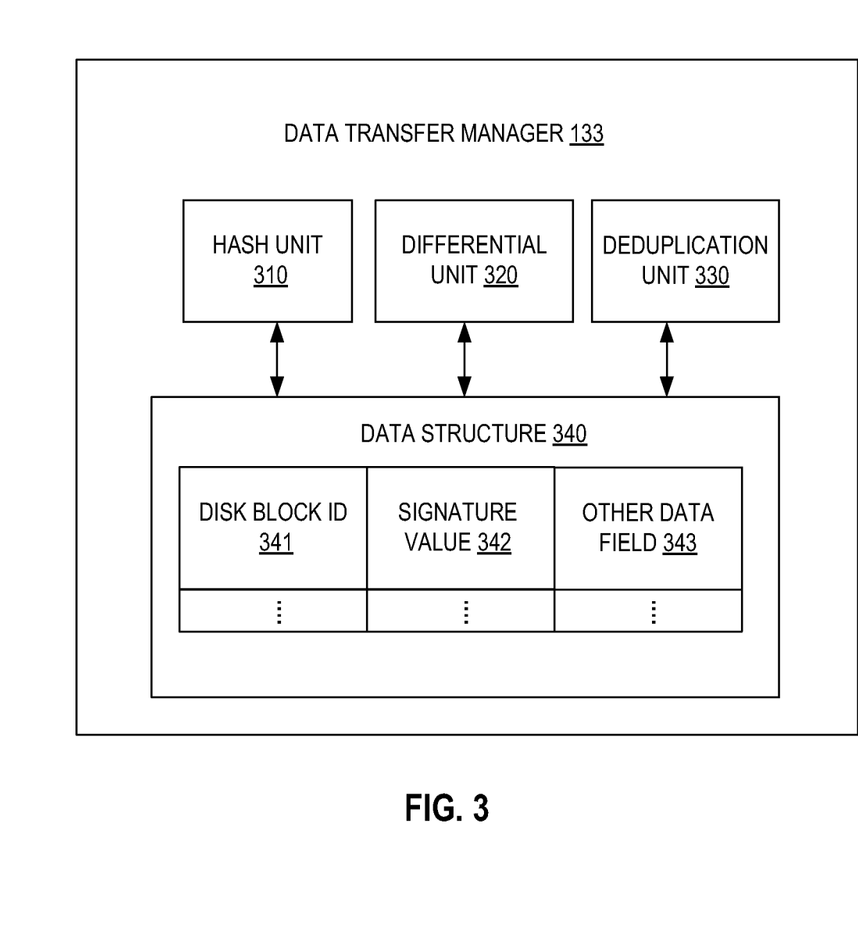
FIG. 3 is a block diagram illustrating one embodiment of a data transfer manager that runs on the host of FIG. 2 to transfer virtual machine images from one location to another.

FIG. 3 is a block diagram that illustrates an embodiment of the data transfer manager 133. In this embodiment, the data transfer manager 133 includes a hash unit 310, a differential unit 320 and a deduplication unit 330. The hash unit 310 hashes the disk blocks in data storage 105 that contain virtual machine images to be transferred. The hash unit 310 performs a hash function on each disk block, using all or some random or predetermined portions of the disk block. The hash function can be a general-purpose hash function (e.g., checksums), special-purpose hash function, cryptographic hash function, or other known hash function. In one embodiment, the hash unit 310 may take a disk block as input and produce a selected portion of the disk block as the output. The results produced by the hash unit 310 are hash values, also referred to as signature values. Each signature value can be a fixed-length or variable-length value, which serves as an identifier of the content of the corresponding disk block. Each signature value can be a portion of the disk block, an entire disk block, or a disk block (or a portion thereof) transformed by a function. A signature value can be any identifier that uniquely (or within a given high probability) identifies the content of a disk block. If two disk blocks have the same signature values, the two blocks will have the same content (or the same content within a given high probability). Thus, the signature values of the disk blocks can be used to identify duplicate disk blocks.

In one embodiment, the data transfer manager 133 also includes a differential unit 320 to identify the disk blocks that are different from the disk blocks in a base image. In one scenario, the base image may be the virtual machine images that have been transferred to the target storage location previously, e.g., images that were transferred in the last backup cycle, or images that have been sent with their users in a previous visit. In another scenario, the base image may be a base virtual machine image that includes the basic files and data of an operating system that runs on a virtual machine, e.g., a Windows XP image or Mac OS image. If the base image is not available at the source storage location, the differential unit 320 can receive a list of base signature values, which are computed from the disk blocks that contain the base image, from the host at the target location or a server from another location. In some embodiments, the data transfer manager 133 may operate without the differential unit 320. In these embodiments, the data transfer manager 133 can identify disk block duplication directly from the virtual machine images without the use of a base image.

The deduplication unit 330 maintains a data structure 340 (e.g., a table) that records disk block IDs 341 (such as physical or logical addresses of the disk blocks in the data storage 105), their corresponding signature values 342, and other data fields 343 that indicate, for example, whether a disk block is part of a base image, or whether a disk block is a duplicate. The deduplication unit 330 identifies disk blocks having the same signature value as duplicate disk blocks, and selects only one of the duplicate disk blocks for transfer to the target location. In one embodiment, the deduplication unit 330 compares the signature values by testing the set membership of each signature value in a set formed by all of the computed signature values. The computed signature values can be organized as a tree, a trie (e.g., a prefix tree), a binary list, or other data structure that facilitates data comparison.

It is noted that the block size for deduplication can vary. However, to improve the performance of deduplication, the block size can be selected to match the internal block size used by the image logic and/or the block size of the file system used in the image (if any) to be deduplicated. A difference choice for the deduplication block size can result in degraded performance. As an example, assume that the deduplication block size is twice as big as the size of a file system block. Further assume that there are two files (File_A and File_B), each having two file system blocks (A, B in File_A, and B, C in File_B), and there are two images (I1 and I2) that contain the same two files (File_A and File_B). In the first image (I1) the blocks on the disk (image) are stored as: ABCD, and in the second image (I2) the blocks are stored as: ACBD. As the deduplication block is twice as big as the stored block, the deduplication logic (e.g., the deduplication unit 330) compares AB !=AC and CD !=BD and no deduplication will be performed. Thus, some duplicate blocks cannot be detected. If the deduplication block is smaller than the file system image block, duplicate blocks will be detected but more work and resources may be necessary. This increase in work and resources results from an increase in the number of corresponding signature values and the operations of comparing these signature values.

Figure 4:
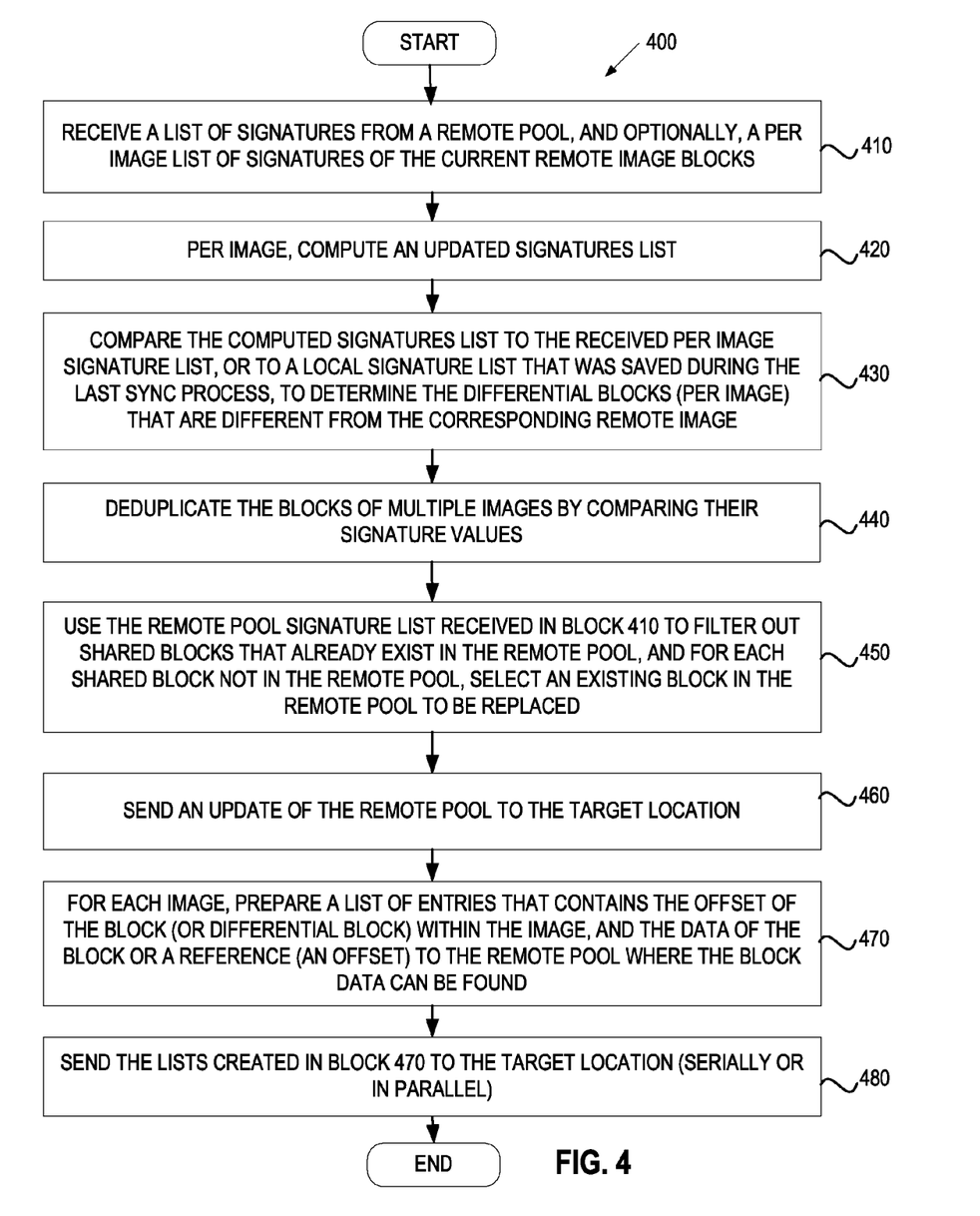
FIG. 4 is a flow diagram illustrating a method for transferring virtual machine images in accordance with one embodiment of the present invention.

FIG. 4 is a flow diagram illustrating one embodiment of a method 400 for transferring virtual machine images from a source storage location (e.g., data storage 105) to a target storage location (e.g., data storage 205 of FIG. 2). The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the data transfer manager 133 at the source location (FIG. 3).

Before describing the method 400, some terminologies are explained. The term "remote pool" is a collection of blocks at the target location that are shared among images. The collection of blocks in the remote pool are referred to as shared blocks. Each shared block is one copy of the identical blocks that can be deduplicated. The remote pool serves as a cache of shared blocks. The size of the remote pool can be controlled by keeping the most frequently used blocks in the pool, subject to a limit set by the server at the target location. The replacement of the blocks in the remote pool is controlled by the server at the source location. The use of the remote pool allows the source site server to use a simple reference (e.g., an offset) to the remote pool to refer to the signature and data of a block or a differential block of an image.

Referring to FIG. 4, in one embodiment, the method 400 begins with the data transfer manager 133 receiving a list of signature values from the remote pool located at the target location (block 410). In one embodiment, in addition to the signature list of the remote pool, the target location can also send, per image, a second list of signature values of the blocks that are currently at the target location (e.g., the blocks that have been transferred from a previous data transfer (e.g., the last sync process). This second list of signature values can be used by the source to compute differential blocks per image. The data transfer manager 133 then computes a signature list per image (block 420) using the data hashing techniques described above. If the second signature list is received, the data transfer manager 133 compares the computed signature list to the received second signature list to determine the differential blocks per image, which are the blocks having signature values different from the corresponding image at the target location (block 430). In one scenario where the image at the target location is updated only from a single source (e.g., the source location), the computed signature list can be compared to a local signature list, which was saved locally from a last sync process. In some embodiments where differential blocks cannot be easily computed or such computation is undesirable, the data transfer manage 133 may directly proceed to deduplicate the blocks of the virtual machine images without performing the operations of block 430.

Subsequently, the data transfer manager 133 compares the signature values of the blocks (or differential blocks) in the images to be transferred to identify duplicate disk blocks, that is, disk blocks having identical signature values (block 440). The data transfer manager 133 then transfers, or causes the host 103 to transfer, disk blocks that have different signature values from the source storage location to the target storage location. Thus, only one copy of a duplicate disk block is transferred. This one copy is referred to as a shared block or a deduplicated block.

In one embodiment, the shared blocks are collected together at the source location. Using the signature list of the remote pool received at block 410, the data transfer manager 133 filters out those shared blocks that already exist in the remote pool at the target location (block 450). For each shared blocks that is not in the remote pool, the data transfer manager 133 selects an existing shared block in the remote pool to be replaced. The replaced shared block in the remote pool can be a block that is not used (referred to) during the current sync process, or least frequently referred to if the remote pool is too small to store the entire shared block set. The operations of block 450 prepare for an update to the remote pool. The update is performed at the source location, which informs the target location where to place a shared block in the remote pool for the current sync process.

After the update computations, the data transfer manager 133 sends the updates of the remote pool to the target location (block 460). For each shared block that is not already in the remote pool, the data transfer manager 133 sends the data of the block, along with an offset at which the block is to be placed in the remote pool (block 460). Thus, the target location can use this information to update its remote pool. The data transfer manager 133 then prepares, for each image, a list of entries (block 470). Each entry is prepared for a block (or a differential block) and contains the offset of the block within the image, and the data of the blocks or a reference (an offset) to the remote pool where the block data can be found. The data transfer manager 133 then sends the list created at block 470 to the target location serially (per image) or multiple lists in parallel (for multiple images at the same time) (block 480). The transfer of these entries enables a direct access to the shared data, and eliminates the need for a relatively expensive lookup mechanism and operations per shared block. After the lists of entries are transferred, the server at the target location uses the lists sent by the source, together with the remote pool, to update the remote images. The data of blocks shared by multiple images (i.e., shared blocks) can be retrieved from the remote pool, and the data of other transferred blocks (i.e., non-shared blocks) can be directly obtained from the lists of entries.

An alternative method to perform de-duplicated sync operations is to send a steam of delta list per image. The entries in the list include the signature of a modified block, the offset of the block within the image, and the new data or a reference to another image block (such as the data offset) at which the data can be read. This alternative method does not need a remote pool or cache. However, one problem with this alternative method is that there may be a dependency on the order of updating the image. This problem arises because the references to other images have to ensure that the referred block is not changed during the sync process. If the referred block changes, one has to ensure that the referred block is read before the change if the old data is needed, or after the change if the new data is needed. Such process is complex and makes the entire sync process strictly serial (ordered), which means that at the target location one has to update the images one after the other. On the other hand, when using the remote pool described in the method 400, the remote pool (that is, the cache of the shared blocks) are updated first (at block 460), and only then the lists of updated blocks (with data and/or references to the remote pool) are sent. It is noted that any delta entries that refer to a deduplicated block use that known remote pool and only that pool. Thus, the method 400 removes the cross image dependencies, and allows any arbitrary ordering on the actual updates performed at the target location. In particular, the method 400 allows parallelization of the image updates.

Figure 5:
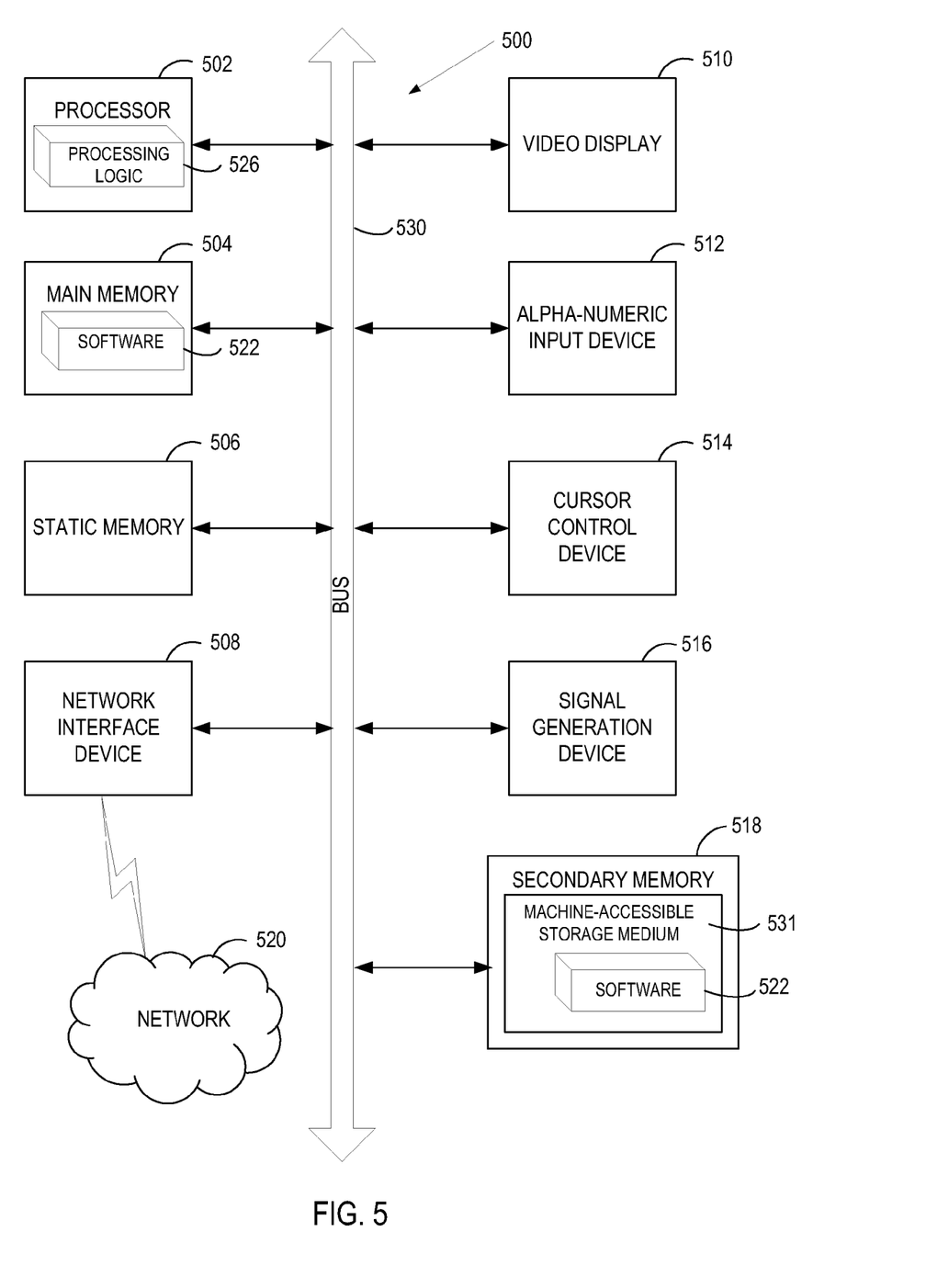
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the data transfer manager 133 of FIGS. 1-3. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
receiving, at a source storage location, a list of signatures per virtual machine image at a target storage location;
identifying, at the source storage location, a plurality of virtual machine images to be transferred to the target storage location, the plurality of virtual machine images comprising images of different virtual machines being transferred from a source host associated with the source storage location to a destination host associated with the target storage location;
computing signature values, at the source storage location, of a plurality of disk blocks that contain the plurality of virtual machine images to be transferred to the target storage location, each signature value corresponding to one of the disk blocks, the computed signature values being associated with base image indicators, each base image indicator specifying whether a respective disk block is part of a base image;
comparing, at the source storage location, the computed signature values with signatures from the received list using the base image indicators to determine a plurality of differential disk blocks associated with the plurality of virtual machine images, each set of the plurality of differential disk blocks being associated with a distinct virtual machine image, wherein comparing the computed signature values comprises testing a set membership of each computed signature value in a set formed by the computed signature values;
deduplicating the plurality of differential disk blocks at the source storage location to identify a subset of differential disk blocks that do not have identical signature values associated with virtual machine images, the deduplicating being performed across virtual machine images of different virtual machines being transferred from the source host to the destination host; and
transferring the subset of differential disk blocks, that do not have identical signature values, from the source storage location to the target storage location over a network.

2. The method of claim 1, wherein computing signature values further comprises:
hashing each of the plurality of disk blocks to obtain the signature value for the disk block.

3. The method of claim 1, wherein transferring the subset of the differential disk blocks further comprises:

comparing the signature values computed from the plurality of differential disk blocks with base signature values that are computed from a base image of a virtual machine; and determining the subset of the differential disk blocks that have the signature values different from the base signature values.

4. The method of claim 1, further comprising:

receiving a list of signature values corresponding to shared blocks in a remote pool that resides at the target location; and sending an update of the remote pool to the target location, the update including data of a shared block that is not currently in the remote pool and an offset at which the shared block is to be placed in the remote pool, the shared block being shared by the virtual machine images.

5. The method of claim 1, wherein computing the signature values further comprises:

determining a differential between a current version of the virtual machine images and a previous version of the virtual machine images; and computing the signature values for the disk blocks that contain the differential.

6. A system comprising:

source data storage to store a plurality of disk blocks that contain a plurality of virtual machine images to be transferred to a target storage location; and a source host coupled to the source data storage, wherein the source host is configured to:

receive a list of signatures per virtual machine image at the target storage location;

identify the plurality of virtual machine images to be transferred to the target storage location, the plurality of virtual machine images comprising images of different virtual machines being transferred from the source host to a destination host associated with the target storage location;

compute a signature value for each of the stored plurality of disk blocks that contain the plurality of virtual machine images to be transferred to the target storage location, each signature value corresponding to one of the disk blocks, the computed signature values being associated with base image indicators, each base image indicator specifying whether a respective disk block is part of a base image;

compare the computed signature values with signatures from the received list using the base image indicators to determine a plurality of differential disk blocks associated with the plurality of virtual machine images, each set of the plurality of differential disk blocks being associated with a distinct virtual machine image, wherein comparing the computed signature values comprises testing a set membership of each computed signature value in a set formed by the computed signature values;

deduplicate the plurality of differential disk blocks at the source storage location to identify a subset of differential disk blocks that do not have identical signature values associated with virtual machine images, the deduplicating being performed across virtual machine images of different virtual machines being transferred from the source host to the destination host;

transfer the subset of differential disk blocks, that do not have identical signature values, from the source storage location to the target storage location over a network.

7. The system of claim 6, wherein each of the virtual machine images is a stored image of a virtual machine that runs on the host.

8. The system of claim 6, wherein the source host further comprises:

a hash unit to hash each disk block to obtain the signature value for the disk block.

9. The system of claim 6, wherein the source host further comprises:

a differential unit to compare the signature values of the plurality of differential disk blocks with base signature values that are computed from a base image of a virtual machine.

10. The system of claim 6, wherein the source host further comprises:

a deduplication unit to identify disk blocks that have identical signature values.

11. A non-transitory computer readable storage medium including instructions that, when executed by a processing system, cause the processing system to perform a method comprising:

receiving, at a source storage location, a list of signatures per virtual machine image at a target storage location;

identifying, at the source storage location, a plurality of virtual machine images to be transferred to the target storage location, the plurality of virtual machine images comprising images of different virtual machines being transferred from a source host associated with the source storage location to a destination host associated with the target storage location;

computing signature values, at the source storage location, of a plurality of disk blocks that contain the plurality of virtual machine images to be transferred to the target storage location, each signature value corresponding to one of the disk blocks, the computed signature values being associated with base image indicators, each base image indicator specifying whether a respective disk block is part of a base image;

comparing, at the source storage location, the computed signature values with signatures from the received list using the base image indicators to determine a plurality of differential disk blocks associated with the plurality of virtual machine images, each set of the plurality of differential disk blocks being associated with a distinct virtual machine image, wherein comparing the computed signature values comprises testing a set membership of each computed signature value in a set formed by the computed signature values;

deduplicating the plurality of differential disk blocks at the source storage location to identify a subset of differential disk blocks that do not have identical signature values associated with virtual machine images, the deduplicating being performed across virtual machine images of different virtual machines being transferred from the source host to the destination host;

transferring the subset of differential disk blocks, that do not have identical signature values, from the source storage location to the target storage location over a network.

12. The computer readable storage medium of claim 11, wherein computing signature values further comprises:

hashing each of the plurality of disk blocks to obtain the signature value for the disk block.

13. The computer readable storage medium of claim 11, wherein transferring the subset of the differential disk blocks further comprises:
- comparing the signature values computed from the plurality of differential disk blocks with base signature values that are computed from a base image of a virtual machine; and
- determining the subset of the differential disk blocks that have the signature values different from the base signature values.

14. The computer readable storage medium of claim 11, wherein the method further comprises:
- receiving a list of signature values corresponding to shared blocks in a remote pool that resides at the target location; and
- sending an update of the remote pool to the target location, the update including data of a shared block that is not currently in the remote pool and an offset at which the shared block is to be placed in the remote pool, the shared block being shared by the virtual machine images.

* * * * *